UNITED STATES PATENT OFFICE.

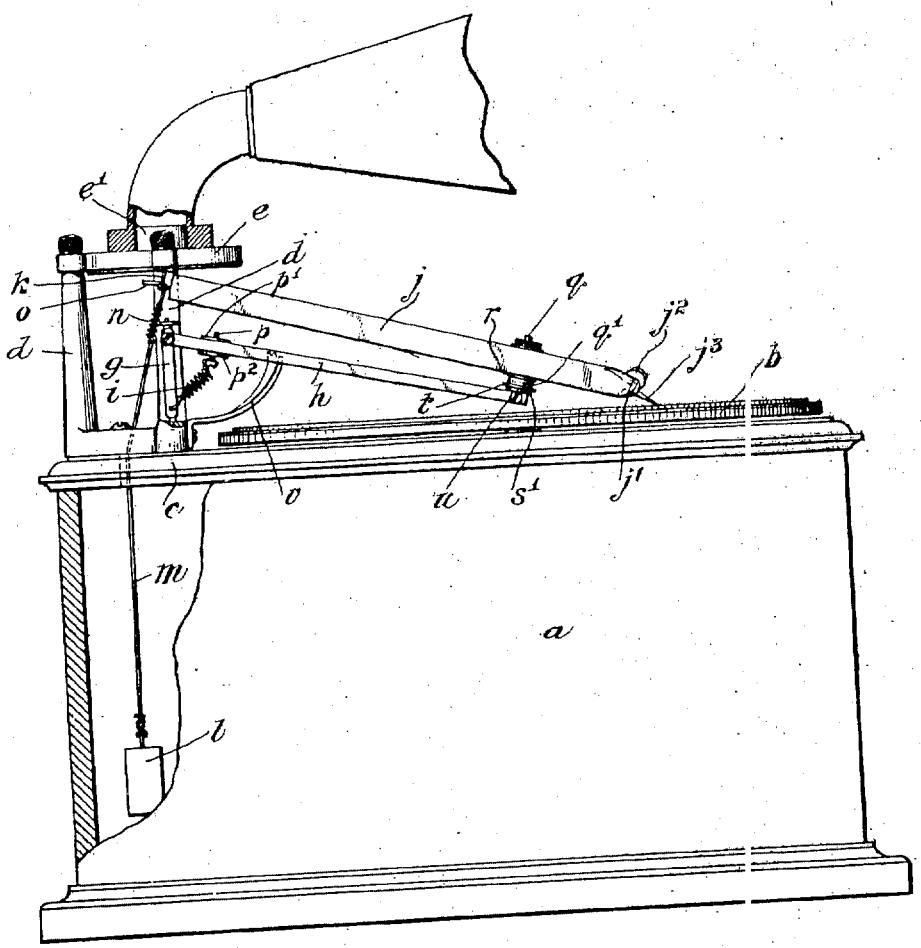

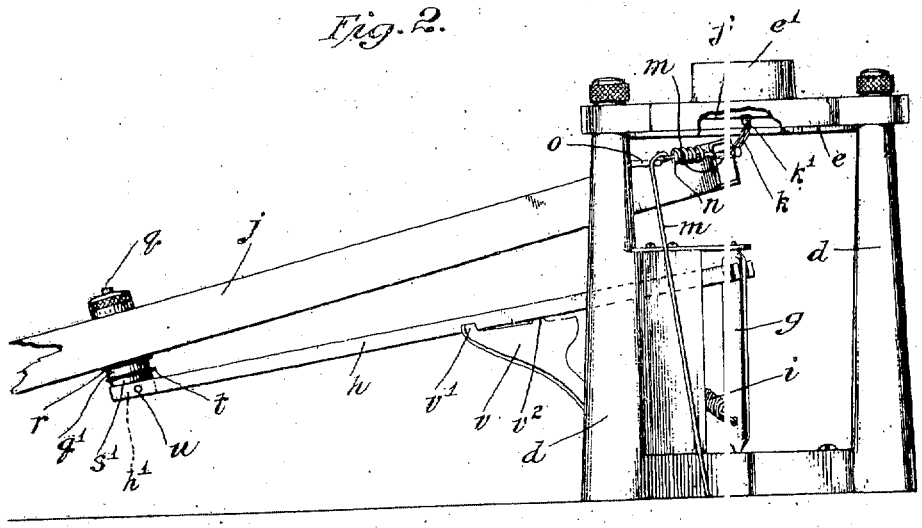
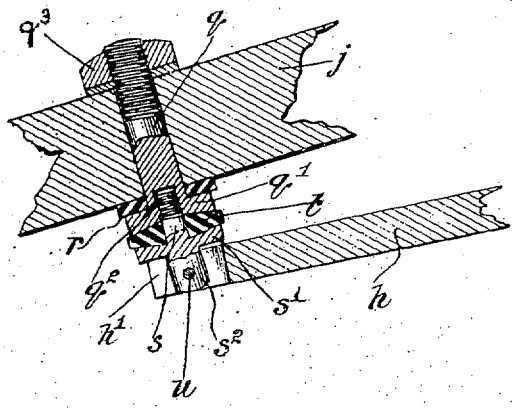
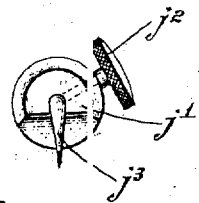

CLINTON B. REPP, OF PLAINFIELD, NEW JERSEY.

PHONOGRAPH.

1,215,410.      Specification of Letters Patent.      Patented Feb. 13, 1917.

Application filed October 29, 1912. Serial No. 728,435.

*To all whom it may concern:*

Be it known that I, CLINTON B. REPP, a citizen of the United States, residing at Plainfield, in the county of Union and State of New Jersey, have invented certain new and useful Improvements in Phonographs, of which the following is a specification, reference being had therein to the accompanying drawings, which form a part thereof.

My invention relates to phonographs, and more particularly to a type of phonograph wherein sound vibrations pass to the diaphragm through a transmitter or vibrator arm, and wherein the diaphragm is subjected to tensioning stresses.

The main object of the invention is to provide a phonograph of this character wherein the diaphragm will be subjected to a constant, uniform and definitely determinable stress which will not vary with the continued operation of the machine, or be affected by the vibrations or rapid flexures of the diaphragm. A further object is to provide a phonograph of this type wherein the constant stress exerted upon the diaphragm will offer no impediments to the flexure of the diaphragm, and more particularly to that flexure of the diaphragm resulting from the transmission of high frequency, short length vibrations or impulses. A still further object is to provide a phonograph in which the direction of the application of the stress to the diaphragm may be varied to adapt the machine for use with either vertical cut or graphophone or lateral cut or gramophone records, wherein the adjustment of the tensioning means may be quickly accomplished without varying the stress on the diaphragm in a substantial degree. A still further object is to provide a phonograph in which the transmitter or vibrator arm has at one end thereof a mount for the reproducing stylus or point, and at the other end thereof a connection with the diaphragm, and is supported adjacent to said mount by a rigid pivotal arm, wherein said transmitter or vibrator arm is connected to said rigid or supporting arm by means which will insulate said transmitter or vibrator arm from said supporting arm to prevent the development of vibrations in said supporting arm and the parts appurtenant thereto. A still further object is to provide a phonograph such as is immediately above referred to, wherein the connecting means between the transmitter or vibrator arm and the rigid supporting arm will be so constructed and arranged as to permit a universal movement of the transmitter or vibrator arm to facilitate the adjustment of the instrument for use with either graphophone or gramophone records. A still further object is to provide a phonograph of this character with a mount for the reproducing stylus or point, which will securely hold the reproducing stylus or point whether the machine be used in connection with a gramophone or a graphophone record, without likelihood of a loosening of the retaining means with a resultant loosening of the reproducing stylus or point, and likelihood of blasts or loss in volume in the sound reproduction. A still further object is to provide a machine of this character in which the supporting arm is acted upon by a spring in a manner to force said arm downwardly and with it the transmitter or vibrator arm in a manner to cause the requisite pressure of the reproducer stylus or point upon the record, wherein conveniently accessible means are provided for regulating the tension of this spring in a manner to avoid any possibility of an accidental variance in the tension of this spring. And a still further object is to provide a machine of this character which may be conveniently assembled, and which when once assembled cannot be readily disarranged or put out of order by the unskilled user.

The invention consists primarily in a phonograph embodying therein a sound box, a diaphragm mounted therein, a transmitter or vibrator arm, a supporting arm therefor, means connecting said transmitter or vibrator arm and said supporting arm, means whereby a reproducing stylus or point may be supported at one end of said transmitter or vibrator arm, a connection between the other end of said arm and said diaphragm, a tensioning member and a flexible, non-resonant strand connecting said tensioning member and said transmitter or vibrator arm adjacent to said diaphragm, whereby said diaphragm is subjected to a continuous, uniform and definitely determinable stress to tension it in a direction opposite to that in which the sound vibrations are passing from said arm to said diaphragm; and in such other novel features of construction and combination of parts as are hereinafter set forth and described, and more particularly pointed out in the claims hereto appended.

Referring to the drawings:—

Figure 1 is a side elevation of an instrument embodying my invention;

Fig. 2 is a rear elevation thereof;

Fig. 3 is an enlarged detail view of the universal connection between the supporting arm and the transmitter or vibrator arm; and Fig. 4 is an enlarged view of the reproducing stylus or point mount.

Like letters refer to like parts throughout the several views.

In the embodiment of my invention shown in the drawings, $a$ indicates a cabinet adapted to contain the motor and other parts for actuating a rotary table $b$, adapted to have a disk record mounted thereon, and $c$ indicates the top slab of said cabinet.

Spaced away from, and to one side of, the axis of the table $b$ are standards $d$ supporting a sound box $e$ having a sound outlet opening $e'$ adapted to be connected to an amplifier.

Mounted within the sound box in any desired manner is a diaphragm $f$ of the usual or any desirable material. Below and in axial alinement with the axis of the diaphragm $f$ is a frame $g$ moving about a vertical axis and mounted upon said frame by means of horizontal pivots is a rigid supporting arm $h$. Acting upon said arm in a manner to force it downwardly or toward the table $b$ is a coil spring $i$ or other means for developing pressure through said supporting arm.

Supported by said arm $h$ is a transmitter or vibrator arm $j$ which is connected adjacent to one end thereof to said supporting arm by means of a universally movable coupling which will be more fully described hereinafter. The said arm $j$ is preferably composed of wood to enhance the tone qualities of the reproduced sound waves, and one end thereof is adapted to support a reproducing stylus or point in a manner to cause it to engage the record while the other end thereof is connected to the diaphragm by means of the flexible loop $k$ and the stud $k'$ carried by the diaphragm $f$, means being utilized for applying a tensioning stress upon said diaphragm through said flexible connection $k$ and stud $k'$.

The construction heretofore described, considered broadly, has been made the subject matter of an application for Letters Patent heretofore filed by me, and it is not therefore my intention to broadly claim these features at this time.

In my aforesaid pending application, I also provide means for varying the direction of the application of the tensioning stress to the diaphragm, the universal connection to which I have heretofore referred, between the supporting arm and the transmitter or vibrator arm being designed to permit that movement of the transmitter or vibrator arm relative to the supporting arm incidental to the changing of the position of the end of the transmitter or vibrator arm adjacent to the diaphragm in varying the direction of the application of pressure above referred to.

Heretofore in applying the tensioning stress to the diaphragm, I have used a coil spring, one end of which was attached to the transmitter or vibrator arm $j$ adjacent to the flexible connection $k$ and the other end of which was attached to a rigid metallic part of the machine. I have always found that this spring arrangement gives highly satisfactory results, so long as the desired tension is maintained in the spring. In practice, however, this spring has two disadvantages: first, owing to the high frequency of the vibrations of the diaphragm, and of this spring, with continued use the spring is apt to lose its resiliency and thus lessen the tension upon the diaphragm; and secondly, this spring being in tension, there is likelihood of a portion of the vibrations being transmitted thereto, although I have not found this of any material importance in the practice of my invention. In fact, with one skilled in the use of this machine, a spring the tension of which may be regulated would prove highly satisfactory, but with the unskilled, it is desirable to provide a tensioning means exerting a fixed, determinable stress upon the diaphragm not subject to variation by reason of continued use.

Means such as I have just referred to are also desirable as facilitating the adjustment of the machine in the factory.

To meet the foregoing conditions, I provide the weight $l$ located within the cabinet $a$ and connect this weight with the end of the transmitter or vibrator arm adjacent to the diaphragm, preferably by means of a flexible cord which has the advantage of tending to prevent vibrations passing from said transmitter or vibrator arm therethrough.

With some types of records, I have found this cord alone to act satisfactorily, but with other records I have secured better results by arranging in the length of this cord a short length coil spring $n$. This spring does not in any way affect the stress exerted by the weight $l$, but it is sufficiently sensitive to permit minute vibrations of the diaphragm without any displacement of the said weight. Hence this spring will have the effect of making the diaphragm more sensitive.

When it is desired to adapt the machine for both vertical cut or graphophone, and lateral cut or gramaphone records, I provide one of the standards $d$ with a hook $o$ adapted to receive the connecting means $m$ between the weight $l$ and the arm $j$. By this means the direction of the application of the stress to the diaphragm may be varied by merely raising the weight and throwing the cord across the hook $o$, which is a simple manner of accomplishing this adjustment and one which may be readily understood by the unskilled public user. The cord $m$ passes through a protected opening in the slab $c$.

One end of the spring $i$ is secured to the frame $g$ and the other end thereof is attached to the arm $h$ by means of a screw threaded spindle $p$ passing through said arm and the nuts $p'$ $p^2$ mounted upon said spindle upon opposite sides of said arm. By this means the tension of the spring $i$ may be varied and the nuts $p'$ $p^2$ so set as to prevent any likelihood of such movement of the spindle $p$ as would accidentally vary the tension of this spring.

Having a close driving fit with an opening extending through the arm $j$, is a screw threaded stem $q$ carrying an enlarged plate $q'$. Between the plate $q'$ and the arm $j$ is a resilient gasket $r$ which is clamped tightly between the said plate and said arm by means of the nut $q^3$ bearing upon the top of said arm. The said stem $q$ is provided with an interiorly screw threaded socket $q^2$ which coöperates with the stem $s$ of a fitting having a flanged portion $s'$ parallel with and oppositely disposed to the plate $q'$ carried by the stem $q$.

The plate $q'$ and flanged portion $s'$ are incaved as shown in Fig. 3, and seated between the oppositely disposed faces thereof is a resilient gasket $t$. The screw threaded connection between the stems $q$ $s$ permits the desired regulation of the compression of the said gasket by the edges of the plate $q'$ and flange $s'$, thus forming a highly effective insulation.

Extending below the flange $s'$ is a stud which is connected to the arm $h$ by means of the pivot screw $u$ extending at right angles to the axis of the said stud $s^2$. The outer end of the arm $h$ is forked at $h'$ to accommodate the stud $s^2$.

By this construction it will be observed that with the raising or lowering of the arms $h$ $j$, the movement of the coupling about the pivot $u$ will compensate for the variance in the arcs described by the two arms $h$ and $j$ and that said movement will also permit a vertical adjustment of the inner end of the arm $j$, adjusting the machine to different types of records. The screw threaded connection between the shanks $s$ and $q$ will permit of that lateral movement of the arm $j$ incidental to adjusting the machine, and regulating the compression of the gasket $t$.

It is to be noted, however, that there is no oscillatory movement about either of these pivots while the arm $j$ is transmitting sound vibrations indicated upon a record, to the diaphragm.

In practice, I have found that great difficulty is encountered in holding the reproducing stylus or point in a mount carried upon the end of the transmitter arm. If the set screw extends horizontally it will not loosen when the instrument is being used upon a lateral cut record, but will become readily loosened if the instrument is used upon a vertical cut record. If the retaining screw be arranged vertically, I have found that it will not loosen when used with a vertical cut record, but will loosen when used with a lateral cut record. To obviate this condition, I set the screw at an angle between the vertical and the horizontal, and I have found in practice that when so set it has little or no tendency to loosen whether the instrument be used with either a vertical or a lateral cut record.

In the accompanying drawings I have shown a metallic mount $j'$ carrying a set screw $j^2$ set at an angle between the vertical and the horizontal, the reproducing stylus or point being shown at $j^3$.

In using the instrument there is a tendency of the spring $i$ to draw the arms $j$ and $h$ downwardly to an extent to bring the point $j^3$ into engagement with the slab $c$ or the table $b$. To prevent damage to a point prior to its application to a record, as well as to facilitate the removal and mounting of the points in the mount $j'$, I provide a rest $v$ adapted to engage the arm $h$ and prevent excessive downward movement thereof under the spring $i$. To prevent any possibility of a lateral displacement of this arm $h$ when a point is being mounted therein or removed therefrom I provide said rest $v$ with the lugs $v'$ and $v^2$ between which the arm $h$ is adapted to seat.

The operation of the herein described device, excepting in so far as the transmission of the sound waves is concerned, is substantially as follows:—

When it is desired to use the instrument upon vertical cut or graphophone records, the cord $m$ is disengaged from the hook $o$ and the weight $l$ is permitted to drop within the cabinet, thus applying stress to the diaphragm $f$ proportionate to the pull exerted by the weight $l$. With the operation of the machine, this weight remains constant, and hence when it is once determined under what pressure it is desired to place the diaphragm, it is merely necessary to apply the desired weight thereto, thus insuring uniform conditions. The spring $n$ does not in any way interfere with the application of the tensioning weight to the diaphragm, as this weight will merely bring the tension of this spring to a point where it will sustain its weight. The spring n has this characteristic, however, that with the flexure or displacement of the diaphragm f, the movement of the weight l must be transmitted through this spring. Hence, any tendency of the weight l to be sluggish in its movement, will be compensated for by this interposed spring, which will flex and permit the desired rapid vibrations in the diaphragm while subjecting it at all times to a pressure equaling that of the weight. This condition arises when sound vibrations of high frequency and short length are passing to the diaphragm. With longer vibrations, a spring interposed in the cord m is not necessary. For a universal machine, however, I prefer to include this spring in the connecting means between the weight and the diaphragm.

When it is desired to adjust the machine for use with lateral cut or gramophone records, it is merely necessary for the user to raise the cord m and with it the weight l and adjust this cord about the hook o. This movement will deflect the arm j and the connecting loop k which is preferably of waxed cord, in a manner to apply the stress exerted by the weight l at an angle to the axis of the diaphragm, as shown more particularly in Fig. 2 of the drawings.

The function of the universally movable connection between the transmitter or vibrator arm j and the supporting arm h has heretofore been referred to, and will not be repeated.

When the spring n is used in connection with the cord m, any loss of flexibility in this spring will not affect the tension upon the diaphragm, as this tension is derived solely from the weight l.

I believe it to be broadly new to provide a phonograph wherein a tensioning stress is placed upon the diaphragm by means of a weight, thus insuring a definite, uniform and constant tensioning of the diaphragm. While I have used a spring for this purpose, I have found in actual practice that a weight not only gives better results by reason of the better tensioning effect upon the diaphragm, but permits the convenient insulation of the tensioning means, and also facilitates, when an adjustable machine is used, the variance in direction of application of pressure without materially affecting the tensioning of the diaphragm.

I also believe it to be broadly new to connect the weight to the transmitter or vibrator arm by a flexible member having an elastic section in its length whereby before the inertia of the weight is overcome, flexure of the diaphragm will be permitted to an extent to make the diaphragm responsive to sound vibrations of high frequency and short length.

Having described my invention, what I claim as new and desire to have protected by Letters Patent, is:—

1. A phonograph, embodying therein a movable record support, a sound box adjacent thereto and spaced away therefrom, a diaphragm mounted in said sound box, a transmitter or vibrator arm adapted to carry a reproducing stylus or point, projecting from adjacent said sound box over said record support, means whereby sound vibrations are transmitted from said arm to said diaphragm, means acting on said arm intermediate the diaphragm and the record support, whereby a downward pressure is exerted thereon, a weight, and a flexible, nonresonant strand connecting said weight and said arm adjacent said diaphragm, whereby said diaphragm and the means transmitting vibrations thereto from said arm are placed under constant, uniform tension.

2. A phonograph embodying therein a movable record support, a sound box adjacent thereto and spaced away therefrom, a diaphragm mounted in said sound box, a transmitter or vibrator arm adapted to carry a reproducing stylus or point, projecting from adjacent said sound box over said record support, means whereby sound vibrations are transmitted from said arm to said diaphragm, means acting on said arm intermediate the diaphragm and the record support, whereby a downward pressure is exerted thereon, a tensioning member, and a flexible non-resonant strand connecting said tensioning member and said arm adjacent to said diaphragm, whereby said diaphragm and the means transmitting vibrations thereto from said arm are placed under constant, uniform tension.

3. A phonograph embodying therein a movable record support, a sound box adjacent thereto and spaced away therefrom, a diaphragm mounted in said sound box, a transmitter or vibrator arm adapted to carry a reproducing stylus or point, projecting from adjacent said sound box over said record support, means whereby sound vibrations are transmitted from said arm to said diaphragm, means acting on said arm intermediate the diaphragm and the record support, whereby a downward pressure is exerted thereon, a tensioning member, and connections between said tensioning member and said arm adjacent to said diaphragm, whereby said diaphragm and the means transmitting vibrations thereto from said arm are placed under constant, uniform tension, said last named connections having an elastic section therein whereby flexure of the diaphragm is permitted without overcoming the inertia of said tensioning member.

4. A phonograph embodying therein a movable record support, a sound box adjacent thereto and spaced away therefrom, a diaphragm mounted in said sound box, a transmitter or vibrator arm adapted to carry a reproducing stylus or point, projecting from adjacent said sound box over said record support, means whereby sound vibrations are transmitted from said arm to said diaphragm, means acting on said arm intermediate the diaphragm and the record support, whereby a downward pressure is exerted thereon, a tensioning member, a coiled spring, and flexible cords extending therefrom to said tensioning member and to said arm adjacent said diaphragm respectively, whereby said diaphragm and the means transmitting vibrations thereto from said arm are placed under constant, uniform tension, and flexure of the diaphragm is permitted without overcoming the inertia of said tensioning member.

5. A phonograph embodying therein a movable record support, a sound box adjacent thereto and spaced away therefrom, a diaphragm mounted in said sound box, a transmitter or vibrator arm adapted to carry a reproducing stylus or point, projecting from adjacent said sound box over said record support, means whereby sound vibrations are transmitted from said arm to said diaphragm, means acting on said arm intermediate the diaphragm and the record support, whereby a downward pressure is exerted thereon, a tensioning member, a flexible, non-resonant strand connecting said tensioning member and said arm adjacent said diaphragm, whereby said diaphragm and the means transmitting vibrations thereto from said arm are placed under constant, uniform tension, and means adapted to be engaged by said flexible strand whereby the direction of the stress of said tensioning member upon the diaphragm may be varied to adapt the instrument to a lateral cut or gramophone record.

6. A phonograph embodying therein a movable record support, a sound box adjacent thereto and spaced away therefrom, a diaphragm mounted in said sound box, a transmitter or vibrator arm adapted to carry a reproducing stylus or point, projecting from adjacent said sound box over said record support, means whereby sound vibrations are transmitted from said arm to said diaphragm, means acting on said arm intermediate the diaphragm and the record support, whereby a downward pressure is exerted thereon, a tensioning member, a flexible non-resonant strand connecting said tensioning member and said arm adjacent said diaphragm, whereby said diaphragm and the means transmitting vibrations thereto from said arm are placed under constant, uniform tension, and a projection or hook adjacent said sound box adapted to be engaged by said flexible strand, whereby the direction of the stress of said tensioning member upon the diaphragm may be varied to adapt the instrument to a lateral cut or gramophone record.

7. A phonograph embodying therein a movable record support, a sound box adjacent thereto and spaced away therefrom, a diaphragm mounted in said sound box, a transmitter or vibrator arm adapted to carry a reproducing stylus or point, projecting from adjacent said sound box over said record support, means whereby sound vibrations are transmitted from said arm to said diaphragm, means acting on said arm intermediate the diaphragm and the record support, whereby a downward pressure is exerted thereon, a weight, a flexible non-resonant strand connecting said weight and said arm adjacent said diaphragm, whereby said diaphragm and the means transmitting vibrations thereto from said arm are placed under constant, uniform tension, and means adapted to be engaged by said connections whereby the direction of the stress of said weight upon the diaphragm may be varied to adapt the instrument to a lateral cut or gramophone record.

8. A phonograph embodying therein a movable record support, a sound box adjacent thereto and spaced away therefrom, a diaphragm mounted in said sound box, a transmitter or vibrator arm adapted to carry a reproducing stylus or point, projecting from adjacent said sound box over said record support, means whereby sound vibrations are transmitted from said arm to said diaphragm, means acting on said arm intermediate the diaphragm and the record support, whereby a downward pressure is exerted thereon, a weight, a coiled spring, flexible cords extending therefrom to said weight and to said arm adjacent said diaphragm respectively, whereby said diaphragm and the means transmitting vibrations thereto from said arm are placed under constant, uniform tension, and flexure of the diaphragm is permitted without overcoming the inertia of said weight, and means adapted to be engaged by said cord between said spring and said weight whereby the direction of stress of said weight upon the diaphragm may be varied to adapt the instrument to a lateral cut or gramophone record.

9. In a phonograph embodying therein a transmitter or vibrator arm, and a supporting arm therefor, a combined universally movable pivotal connection and vibration insulation between the two, comprising a stem fitted to said transmitter or vibrator arm, a plate carried thereby, an insulating gasket between said plate and said arm, a fitting pivotally connected to said supporting arm and having a flange parallel with said plate, said stem and said fitting having cooperating screw threaded means whereby said parts may be drawn together and a pivotal movement of one of said parts relatively to the other is permitted, and an insulating gasket mounted between said plate and said flange, the surfaces of said plate and of said flange presented opposite to each other being concave.

10. In a phonograph embodying therein a diaphragm, a transmitter arm, a flexible connection between one end of said arm and said diaphragm, means tensioning the diaphragm comprising a weight and a flexible cord connecting said weight and said transmitter arm end.

11. In a phonograph embodying therein a diaphragm, a transmitter arm, a flexible connection between one end of said arm and said diaphragm, means tensioning the diaphragm comprising a weight and a flexible, vibration absorbing cord connecting said weight and said transmitter arm end.

12. In a phonograph embodying therein a diaphragm, means tensioning the diaphragm comprising a weight, a flexible cord connecting said weight and said diaphragm, and a spring inserted in the length of said cord whereby said diaphragm may flex without overcoming the inertia of said weight.

In witness whereof, I have hereunto affixed my signature, in the presence of two subscribing witnesses, this 22nd day of October, 1912.

CLINTON B. REPP.

Witnesses:
 OTTO MUNK,
 EUGENE WENING.

Copies of this patent may be obtained for five cents each, by addressing the "Commissioner of Patents, Washington, D. C."